US007961938B1

(12) United States Patent
Remedios (10) Patent No.: US 7,961,938 B1
(45) Date of Patent: Jun. 14, 2011

(54) FINDING AND STRUCTURING IMAGES BASED ON A COLOR SEARCH

(75) Inventor: Irvin Jude Francis Remedios, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 752 days.

(21) Appl. No.: 11/479,850

(22) Filed: Jun. 30, 2006

(51) Int. Cl.
*G06K 9/00* (2006.01)
(52) U.S. Cl. ........ 382/162; 382/100; 382/165; 382/224; 707/705; 707/722
(58) Field of Classification Search ............... 382/103, 382/162–173, 224, 263, 278, 305; 345/589, 345/619; 715/700, 835
See application file for complete search history.

(56) References Cited

U.S. PATENT DOCUMENTS

| 5,583,950 | A  | * | 12/1996 | Prokoski ............... | 382/212 |
| 5,586,197 | A  | * | 12/1996 | Tsujimura et al. ...... | 382/162 |
| 5,751,286 | A  | * | 5/1998 | Barber et al. ........... | 715/835 |
| 5,982,369 | A  | * | 11/1999 | Sciammarella et al. .. | 715/835 |
| 6,519,360 | B1 | * | 2/2003 | Tanaka .................. | 382/162 |
| 2002/0051205 | A1 | * | 5/2002 | Teranishi et al. ....... | 358/1.18 |
| 2002/0110276 | A1 | * | 8/2002 | Kasutani ............... | 382/165 |
| 2002/0131641 | A1 | * | 9/2002 | Luo et al. .............. | 382/218 |
| 2002/0178135 | A1 | * | 11/2002 | Tanaka ................. | 707/1 |
| 2003/0080977 | A1 | * | 5/2003 | Scott et al. ............. | 345/629 |
| 2003/0164827 | A1 | * | 9/2003 | Gottesman et al. ..... | 345/419 |
| 2007/0098266 | A1 | * | 5/2007 | Chiu et al. ............. | 382/224 |

FOREIGN PATENT DOCUMENTS

EP 0130865 A1 * 4/2003

OTHER PUBLICATIONS

ColorMatch 5K, www.colormatch.dk/cm5k.html, Printed on May 1, 2006.
ColourMod, DHTML Colour Picker, www.colourmod.com, Printed on May 1, 2006.
Color Blender, Your free online color matching toolbox, www.colorblender.com, Printed on May 1, 2006.
ColorCombos, Web Color Combinations Tool and Library, www.colorcombos.com, Printed on May 1, 2006.
Color Schemer, Create matching color schemes at the click of a button, www.colorschemer.com, Printed on May 1, 2006.
Colourlovers, loving colours since 1981, www.colourlovers.com, Printed on May 1, 2006.
KrazyDad, Color Fields Colr Pickr, www.krazydad.com/colrpickr, Printed on May 1, 2006.
Topics in the Accessible Color project, Perceptual Color Space, www.graphics.cs.brown.edu/research/color/topics/html#group, Printed on Apr. 18, 2006.
Miller et al., Brown University, Computer Graphics Group, Accessible Color, http://graphics.cs.brown.edu/research/color, Printed on Apr. 18, 2006.

* cited by examiner

*Primary Examiner* — Sath V Perungavoor
*Assistant Examiner* — Jason Heidemann
(74) *Attorney, Agent, or Firm* — Van Pelt, Yi & James LLP (57) ABSTRACT

Displaying objects from a search is disclosed, including receiving a search color, searching through a collection of one or more objects based at least in part on the search color to obtain a resulting set of one or more objects, determining a display parameter for each of the resulting set of objects to obtain a set of one or more display parameters, and displaying the resulting set of objects based on the set of display parameters.

24 Claims, 9 Drawing Sheets
(3 of 9 Drawing Sheet(s) Filed in Color)

FINDING AND STRUCTURING IMAGES BASED ON A COLOR SEARCH

BACKGROUND OF THE INVENTION

Artists and designers working with graphics software may be interested in using color to create, share, and find artwork. Users in general may be interested in searching for objects based on color. For example, text-based image and video search have recently become popular tools on the web. However, color has typically been a neglected element of computer graphics and search. Existing tools for finding colors or finding images based on color are limited or non-existent. An improved method of color search and displaying results from a color search is needed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
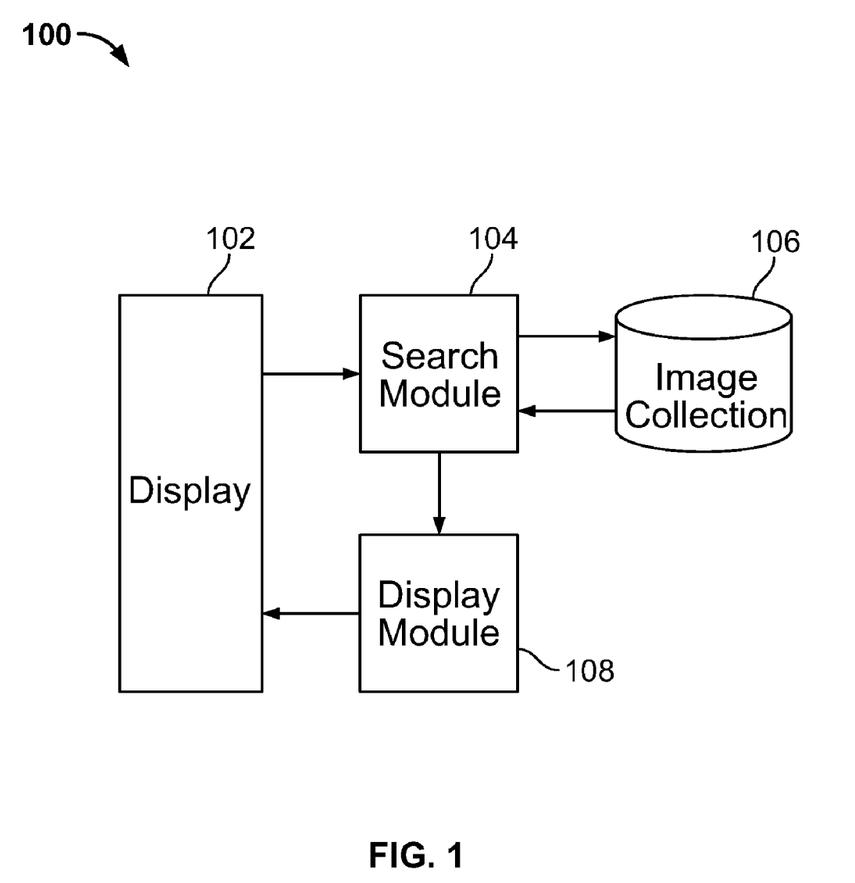
FIG. 1 is a block diagram illustrating an embodiment of a system for performing a color search.

FIG. 1 is a block diagram illustrating an embodiment of a system for performing a color search. As used herein, "color search" refers to searching for a color or for an object associated with a color. Examples of objects include images, colors, color schemes, patterns, graphics, video, slides, animation, or other data. Although images may be discussed herein, any object associated with color may be used in other embodiments. System 100 includes display 102, search module 104, image collection 106, and display module 108.

Display 102 may include a computer monitor for displaying a user interface for performing a color search and/or for displaying results from the color search. For example, a user may input search parameters using the user interface via a keyboard, pointing device (e.g., a mouse), or a touch screen. Search parameters are passed to and processed by search module 104, which searches image collection 106 to obtain a resulting set of images. The resulting images are provided to display module 108, which determines how to display the images on display 102. For example, display module 108 may be configured to display the images scaled in size according to the amount of a search color the image contains.

System 100 is implemented in various ways in various embodiments. In some embodiments, display 102 is associated with an internet browser application, such as Microsoft Internet Explorer or Mozilla Firefox. A user specifies a particular website or Uniform Resource Locator (URL) via which access to system 100 is obtained. A user can provide a username and password via a website and search through, modify, manage, or in general interact with image collection 106. In some embodiments, some or all of system 100 is associated with an application installed on a computer. A user may install an application on a computer and display 102, search module 104, display module 108, and image collection 106 are stored on and run on the computer. In some embodiments, a client running on a user's computer interacts with a remote server, for example, associated with search module 104, display module 108, and/or image collection 106. System 100 may include a variety of servers (e.g., file server, web server, etc.) or network interfaces as needed. A server (e.g., associated with search module 104, image collection 106, and/or display module 108) may provide services for multiple clients and multiple users may be able to collaborate and/or access a common collection of images. In some embodiments, certain users are not permitted to access a certain group of images. For example, commercial graphics designers working on an advertisement may wish to keep their work private and limit access to collaborators. In some cases, users may wish to make their collection of images public. Privacy settings can be used and set to appropriate values.

In some embodiments, system 100 is associated with creation or manipulation of colors. For example, system 100 is associated with commercially available design products such as Adobe® Creative Suite, Adobe® Illustrator®, and Adobe® InDesign®, some of which include functions and features to search for colors, upload colors, download colors, etc. In some embodiments, image collection 106 includes colors. In some embodiments, colors are able to be grouped together (e.g., by a user) to create a collection of colors or color palette. In some embodiments, image collection 106 includes images, such as digital photographs (including stock photographs, personal photographs, photographs of products), animation, graphics, etc. For example, a graphics designer may want to find a stock photograph that fits into a color scheme she has in mind.

System 100 is not necessarily limited to use by graphics designers or other professionals who generate and manipulate images. In some embodiments, system 100 has personal or commerce related applications. For example, a user can search through a collection of images for items to print out, download to their desktop, manipulate and post on a website, etc. In another application, shoppers search through a collection of products for products with a certain color. Some example products are apparel, accessories, furniture, home décor related items (e.g., paint, drapes, carpet, etc.), automobiles, etc.

Figure 2:
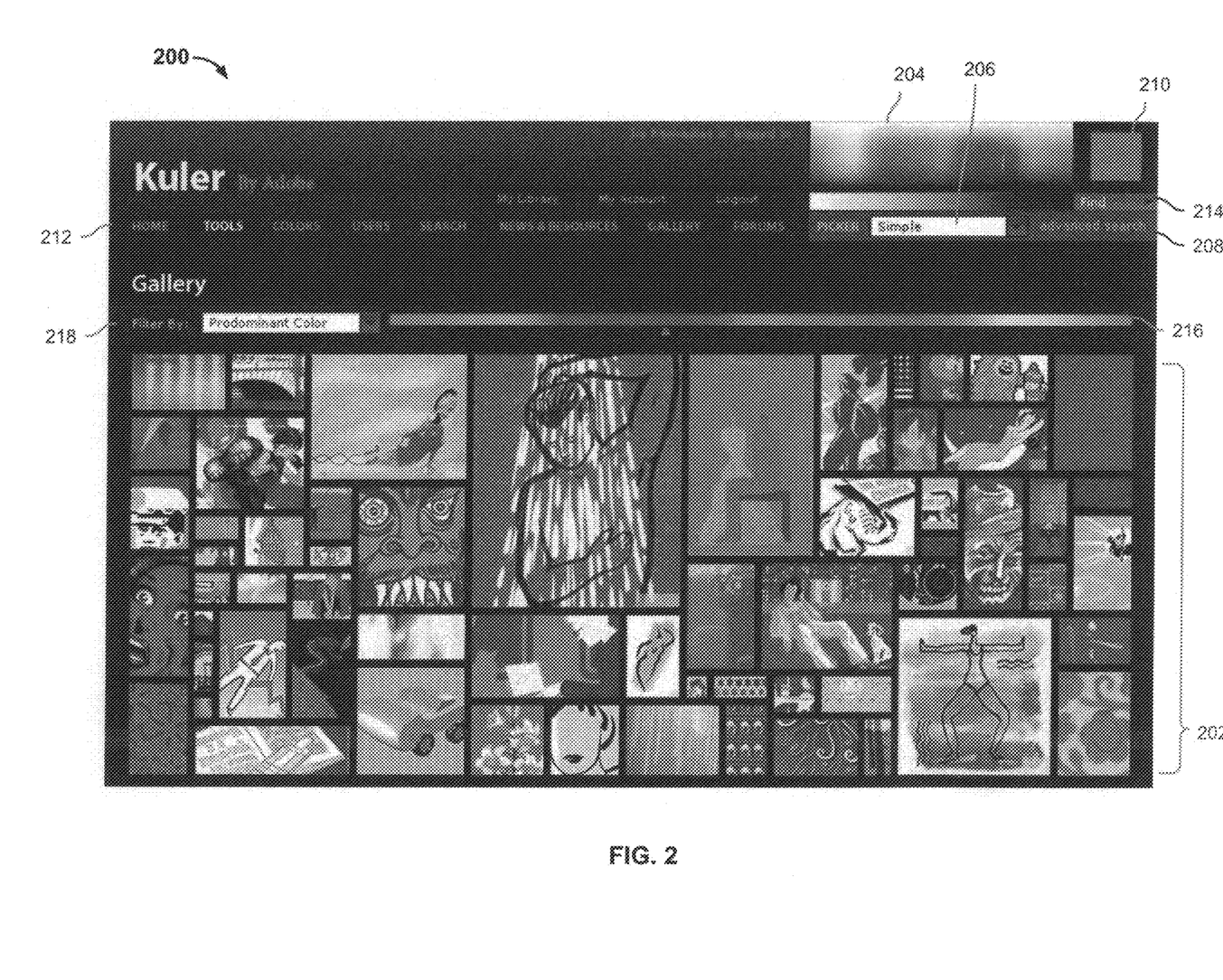
FIG. 2 is an example of a user interface for performing a color search and displaying results from the search.

FIG. 2 is an example of a user interface for performing a color search and displaying results from the search. In this example, user interface 200 may be provided to a display, such as display 102. As shown, user interface 200 includes a variety of information associated with specific color(s) to search on, displaying color(s) to search on, and displaying results of a search, such as color picker 204, color picker type indicator 206, advanced search button 208, color picked 210, find menu 214, color filter bar 216, filter menu 218, and results display 202.

Color picker 204 is a substantially continuous range of colors from which the user can select a color to search on using, for example, a pointing device such as a mouse. The granularity of the spectrum may be different in different embodiments. Color picked 210 indicates the color selected, or the search color. In some embodiments, the color selected is indicated in other ways, e.g., by a dot or other marker at an appropriate location above color picker 204 and/or displaying RGB values. Color picker type indicator 206 indicates the type of color picker used (i.e., there are different types of color picker 204). In this example, the type is "Simple." Selecting advanced search button 208 causes an advanced search interface to open, as more fully described below. Find menu 214 is an alternative way to select a search color. Find menu 214 may provide various options for searching for a color and in some embodiments, additional search options/parameters or new search windows are displayed by interacting with find menu 214. For example, Find menu 214 may include an option for entering RGB values to specify a search color. Interface 200 is one example of a search interface and supported features. In other embodiments, other interfaces are provided for selecting or specifying a search color.

As shown, color picker 204 is a two dimensional spectrum of color. In the horizontal direction, the color transitions across the visible light spectrum. In the vertical direction, the color transitions from dark to light. In this example, the user has selected a color approximately in the center of color picker 204, or turquoise. In some embodiments, color picker 204 is one dimensional.

Results display 202 shows the images resulting from a search using the search color (turquoise). In some embodiments, a collection of images that a search is performed on is specified or indicated by a user. For example, in some interfaces a user is able to select images to be searched based on a directory, file name, network resource, network, domain, etc.

As shown, images displayed in results display 202 are scaled or sized based on the amount of search color each image has. This may be done in various ways. For example, images may be scaled according to the number of pixels with the search color that an image contains. In another example, images may be scaled according to the percent of the search color in the image. In some embodiments, a color histogram is used in determining the size of an image displayed in results display 202.

In some embodiments, selecting or double clicking on an image in results display 202 causes an interface or display to open. In some embodiments, a new interface is configured to display the original photo, tag information, copyright information, purchase and/or download options, and/or other images (e.g., with a tag in common, that have a common creator or contributor, etc.).

As shown, the images may be arranged in a collage to minimize gaps between images and/or maintain a substantially uniform gap between images. There may be a scrollbar next to results display 202 for viewing images if they don't all fit on a screen. In some embodiments, images in the collage are arranged so that images that contain more of the search color are displayed towards the top and images that contain less of the search color are displayed towards the bottom. In some embodiments, a display module processes images in a variety of ways to support a substantially uniform gap between images. To simplify placement of scaled images within a collage, defined scale sizes or scaling units are used in some embodiments. For example, images are scaled to have a height/width that is an integer multiple of a common scaling unit. In some embodiments, images are cropped and/or padded (e.g., add space on the sides or top/bottom as needed). In some embodiments, all images displayed in results display 202 satisfy a defined aspect ratio. These and other techniques may enable scaled images to more easily be arranged in a collage.

Filter menu 218 may be used to filter the images resulting from a search based on color. For example, they may be filtered by predominant color, such that only images with the search color as the predominant color are shown. Color filter bar 216 may be used to specify the predominant color. The resulting images may be filtered by tag, objects depicted in the image, user rating, etc. Other examples of filtering are more fully discussed below.

Figure 3A:
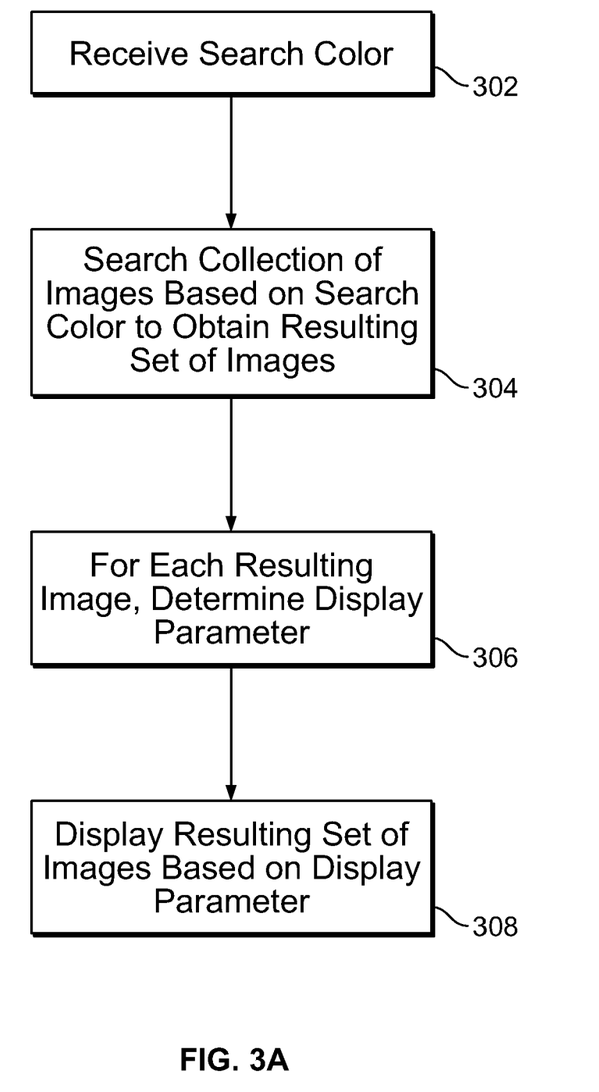
FIG. 3A is a flow chart illustrating an embodiment of a process for performing a color search.

FIG. 3A is a flow chart illustrating an embodiment of a process for performing a color search. In the example shown, a search module and/or display module may use the example process to search through an image collection or repository for images with a certain color. At 302, a search color is received. For example, a user selects a color by clicking a mouse cursor over the desired search color in color picker 204. In some embodiments, a search is performed based on multiple search colors and multiple colors are received at 302. At 304, a collection of one or more images is searched through based at least in part on the search color to obtain a resulting set of images. The collection to search may be user or application/program specified. For example, a collection of images may include images stored in a database, on a server (e.g., a photo sharing website), on a local hard drive, in a specified folder, images that have a specified tag, a stock photo image collection, etc. The collection may be a subset of a larger collection of images (e.g., photos owned by a particular user on a photo sharing website). A color histogram analysis may be used (e.g., define a number of bins and generate a histogram using the defined bins) to find images that satisfy the search criteria. For example, for each image in the collection, it is determined whether the search color is present in the histogram. In some embodiments, a certain amount (e.g., number of or percent of pixels) of the search color must be present in an image for it to satisfy the search criteria. These and other search parameters may be user specified and/or adjusted. A color histogram may be precomputed for each image or computed during the search. In some embodiments, once an image has been analyzed, metadata is stored specifying color information, such as color histogram information, the number of pixels of one or more colors or color ranges. For example, storing metadata may make subsequent searching faster since the analysis does not need to be performed again. In some embodiments, a collection of images is indexed for color data.

At 306, for each of the resulting set of images, a display parameter is determined. A display parameter may be determined based at least in part on a metric. The display parameter may be determined based on a combination of metrics, in which case each metric may be weighted. For example, for each image, a color histogram may be analyzed and used to determine metrics such as the number of pixels of the search color in the image, the percentage of the search color in the image, or the density of the search color in the image, etc. At 308, the resulting set of images is displayed based on the display parameter. For example, the display parameter may include the size of the image and/or the order in which the images are displayed. The display parameter may include text to be displayed such as "98% match." In the example of FIG. 2, the display parameter is the size of the image; that is, the images are scaled based at least in part on a metric (in this case, the number of pixels of the search color). The scaling may be performed in various ways. In some embodiments, images are scaled proportionally to their metric value. In some embodiments, all images whose metrics fall within a certain range are scaled to the same size.

In some embodiments, a collection is filtered and subfiltered by various criteria, such as tags, date, size, user name, format, metadata, photo versus drawing, object depicted, shape of object depicted (e.g., shaped like a car, circle, apple), etc. For example, the collection searched may comprise photos on a photo sharing website tagged "cat." As used herein, a tag refers to text that is associated with an object. Tagging refers to the process of assigning a tag to an object. For example, a user may decide to tag all photos that include his friend Bob with the tag "bob." One or more tags may be assigned to an object and multiple users may be able to assign a tag to a given object.

In some embodiments, filtering provides a way to provide further search parameters once a search is performed. Any search parameter provided during the initial search may also be provided as a filtering option, and vice versa.

In some embodiments, a search is performed based on two or more search colors. In some embodiments, a search is performed over a range of search colors or using a tolerance associated with a search color. For example, rather than selecting an exact, single color in color picker 204, a square may be used to indicate a range of search colors that includes all colors within the square. Similarly, a line may be used to indicate all colors along the line as search colors. A tolerance may be specified by a user. For example, a search color is selected and a tolerance percentage is entered by a user in an input box. The percentage may be associated with RGB or other appropriate values. Any search parameter may be entered using text. In some embodiments, multiple color pickers are provided for selecting multiple colors or multiple ranges of colors. A color scheme (i.e., palette or harmony) may be selected. A color scheme is a set of colors that are grouped together by a user or automatically. For example, a user may create a color scheme associated with autumn that includes brown, red, and yellow.

Search color(s) may be specified in various ways. For example, a range of colors, a distribution of colors, a dominant color (which may be defined in various ways), color(s) preferred by a specified user, color(s) associated with a theme (e.g., forest, beach), color(s) associated with a color swatch (e.g., natural, bright, pastel), colors similar to that in a specified image (e.g., that share a similar histogram within a given tolerance), a spatial distribution of colors (e.g., with blue in the top portion of the image, and green in the bottom portion of the image if the user is looking for meadow images), or a name of a color or color scheme may be specified. In the case of spatial distribution, a color histogram that includes spatial information may be used to perform the search. Colors may be excluded as search colors. Black and white, sepia, or colors with certain tones may be specified as search colors. An eye dropper tool (as in Adobe® Photoshop®) may be used to specify search color. For example, the eye dropper tool enables a user to select a color by hovering a cursor over one or more pixels in an image and selecting the color by clicking a button on a mouse or other input device.

Natural language processing is used in some embodiments in conjunction with names of colors and colors schemes. A text box may be provided to allow the user to enter search text such as "images with a fall scheme containing a red circular object." A natural language processor may be used to parse such a search request and provide the appropriate search criteria and/or parameters to the search module. In some embodiments, natural language processing is used to specify a collection of images to search. For example, a user may enter the phrase, "search through images with a tag of "Blue" to specify images to search.

Figure 3B:
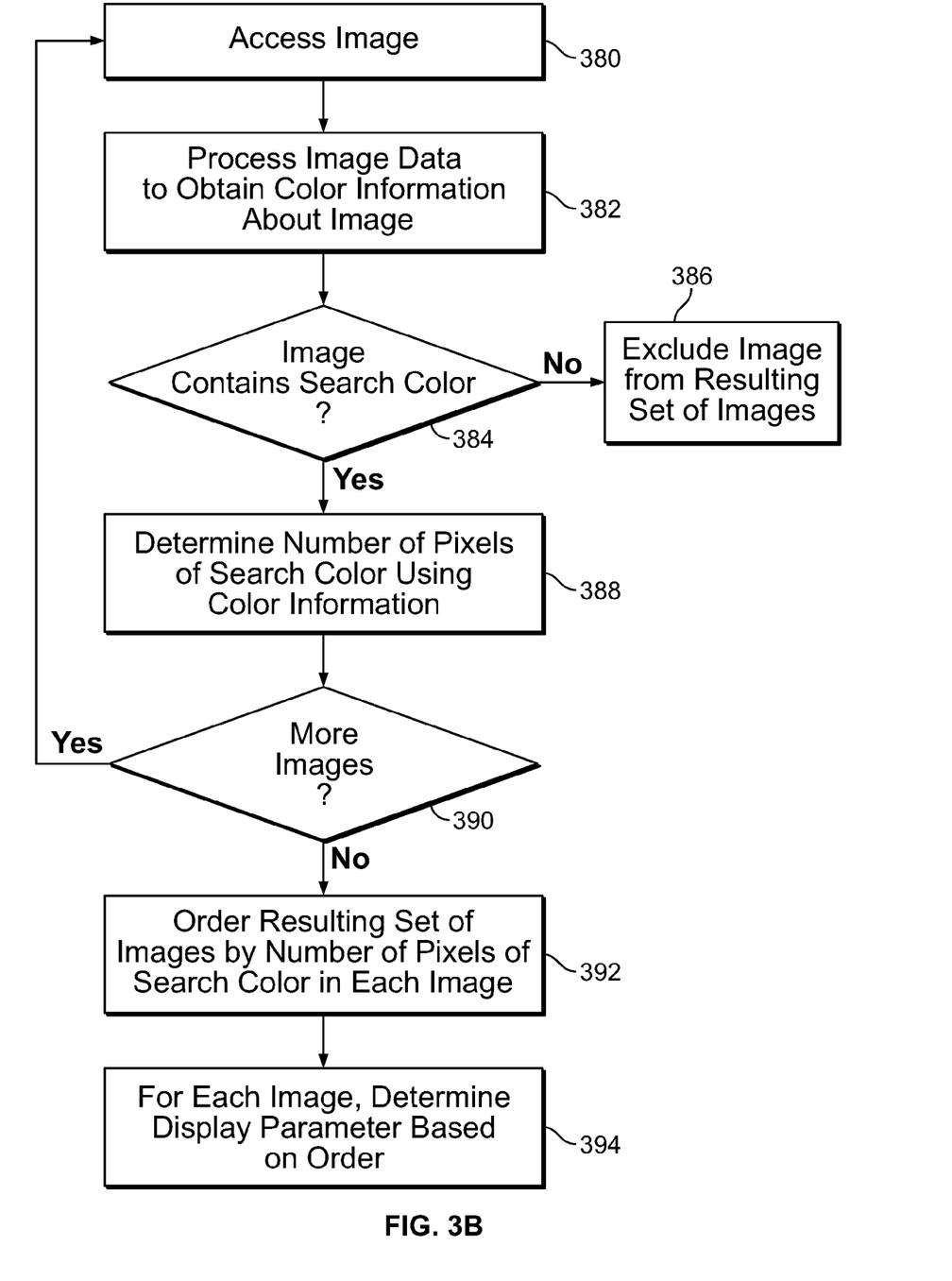
FIG. 3B is a flow chart illustrating an embodiment of a process for searching images and determining a display parameter based on a relative amount of the search color in each image.

FIG. 3B is a flow chart illustrating an embodiment of a process for searching images and determining a display parameter based on a relative amount of the search color in each image. For example, this process may be used to perform 304 and 306.

At 380, an image is accessed. For example, the image may be accessed from a collection of images to be searched. The image may be randomly selected from the collection of images, or selected based on one or more rules (e.g., select images based on size, date created, etc.). The image may be obtained locally (e.g., from a local disk drive) or remotely (e.g., downloaded from a server). At 382, image data is processed to obtain color information about the image. Color information may include any information associated with the color content of the image. For example, color information may include the color of each pixel in the image, the number of pixels of each color in the image, the color(s) in the image, etc. In some embodiments, a color histogram of the image is accessed or computed. An example of computing a color histogram is more fully described below. The image may be associated with metadata that includes color information about the image. The metadata may include a color histogram or other data related to the number of pixels corresponding to various colors or ranges of colors.

At 384, it is determined whether the image contains the search color. This may be determined based on the color information. If the image does not contain the search color, the image is excluded from a resulting set of images at 386. If the image contains the search color, the number of pixels of the search color is determined using the color information at 388. As previously described, the search color may comprise a range of colors, hues, tones, etc. At 390, if there are more images, the process returns to 380 for the next image. If there are not any more images, the resulting set of images is ordered by the number of pixels of the search color in each image at 392. At 394, for each image, a display parameter is determined based on the order determined at 392. For example, the display parameter is the size that the image is displayed, and the size of the image is proportional to the number of pixels of the search color in the image.

Figure 3C:
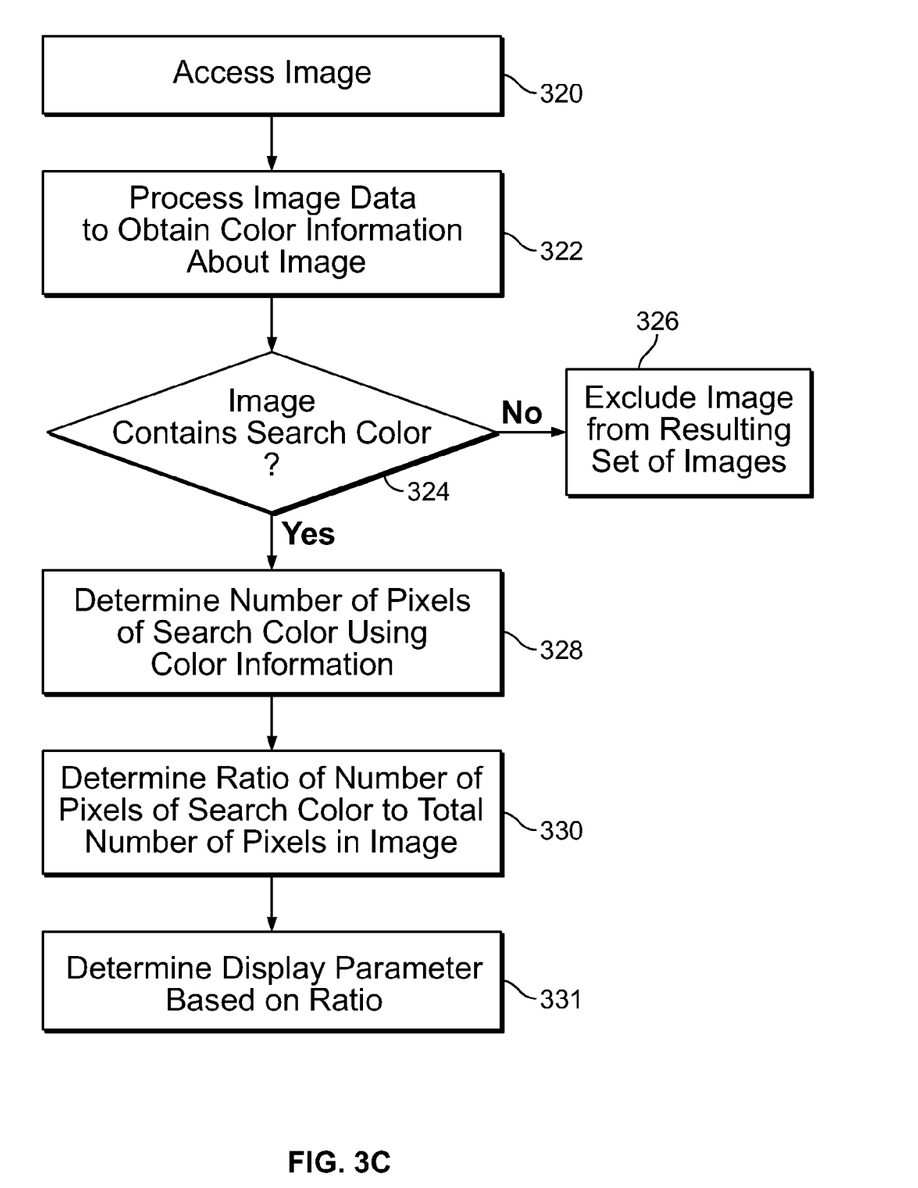
FIG. 3C is a flow chart illustrating an embodiment of a process for searching images and determining a display parameter based on an absolute amount of the search color in each image.

FIG. 3C is a flow chart illustrating an embodiment of a process for searching images and determining a display parameter based on an absolute amount of the search color in each image. For example, this process may be used to perform 304 and 306.

At 320, an image is accessed. For example, the image may be accessed from a collection of images to be searched. The image may be the randomly selected from the collection of images, or selected based on one or more rules (e.g., select images based on size, date created, etc.). At 322, image data is processed to obtain color information about the image. Color information may include any information associated with the color content of the image. For example, color information may include the color of each pixel in the image, the number of pixels of each color in the image, etc. In some embodiments, a color histogram of the image is accessed or computed. An example of computing a color histogram is more fully described below. The image may be associated with metadata that includes color information about the image. The metadata may include a color histogram or other data related to the number of pixels corresponding to various colors or ranges of colors.

At 324, it is determined whether the image contains the search color. This may be determined based on the color information. If the image does not contain the search color, the image is excluded from a resulting set of images at 326. If the image contains the search color, the number of pixels of the search color is determined using the color information at 328. As previously described, the search color may comprise a range of colors, hues, tones, etc. At 331, the ratio of the number of pixels of the search color to the total number of pixels in the image is determined. At 330, a display parameter is determined based on the ratio. For example, the display parameter is the size that the image is displayed, and the ratio is proportional to the size of the image.

Figure 3D:
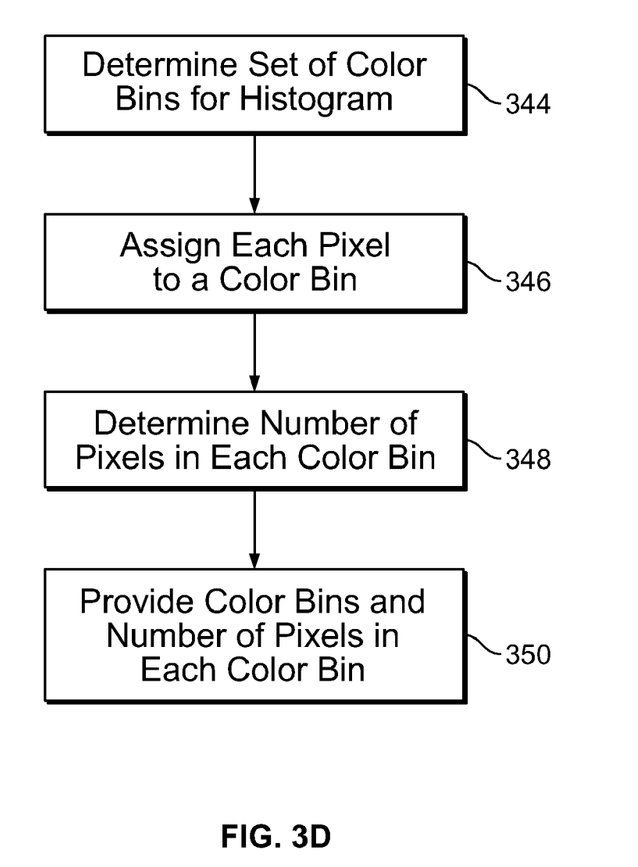
FIG. 3D is a flow chart illustrating an embodiment of a process for computing a color histogram.

FIG. 3D is a flow chart illustrating an embodiment of a process for computing a color histogram. For example, this process may be used to perform 382 and 322 for an image. At 344, a set of color bins for the histogram is determined. Each bin may correspond to a range of colors. For example, the bin ranges may be defined by RGB values where each bin is defined by three dimensions: a range of red values, a range of green values, and a range of blue values. At 346, each pixel of the image is assigned to a color bin based on the color of the pixel. For example, a pixel with a given RGB value is assigned to the bin corresponding to a range that includes the RGB value. At 348, the number of pixels in each color bin is determined. At 350, the color bins and number of pixels per color bin is provided. In various embodiments, this information may be stored in a table, database, file, etc.

Figure 3E:
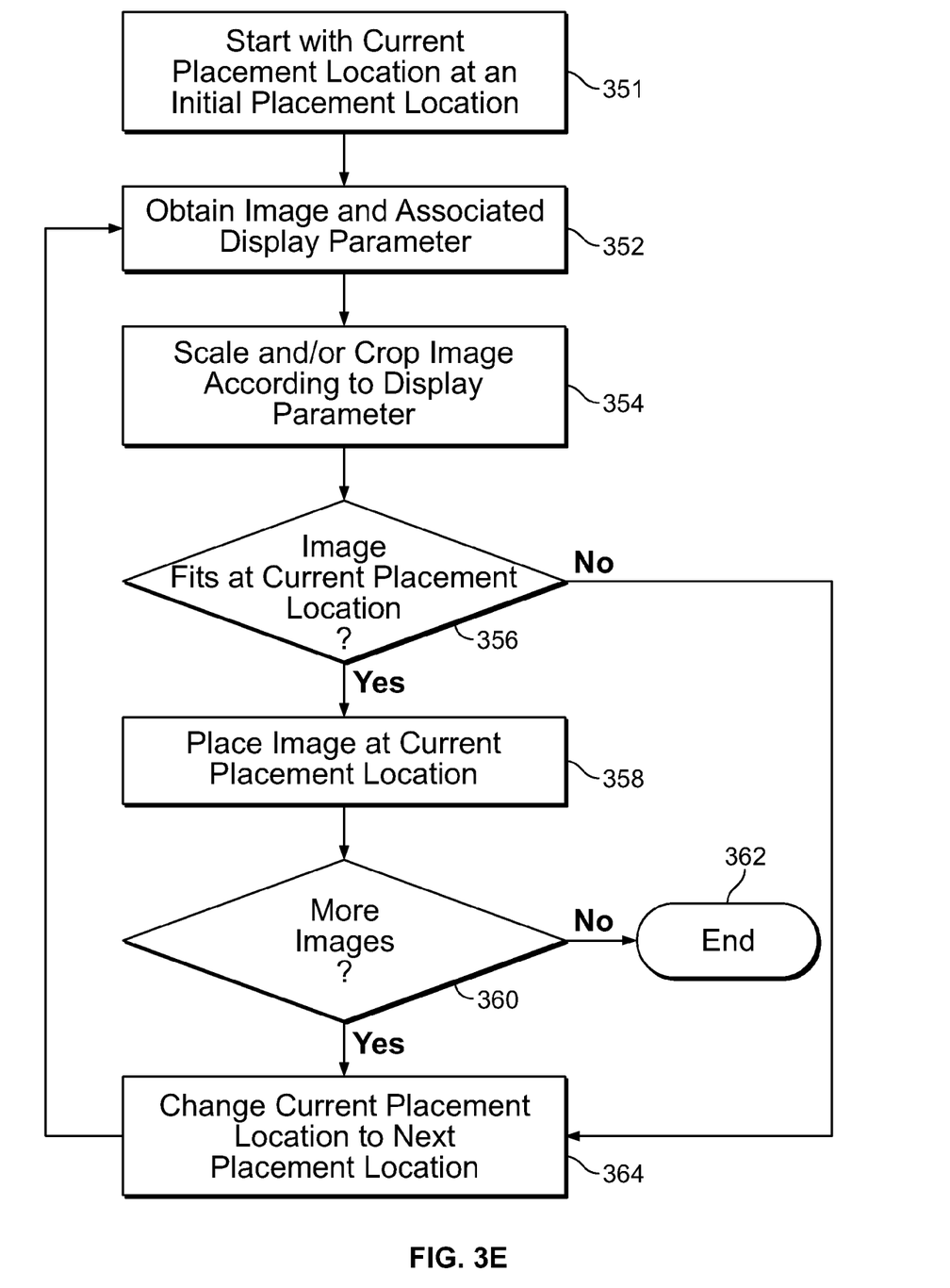
FIG. 3E is a flow chart illustrating an embodiment of a process for displaying a resulting set of images based on a display parameter.

FIG. 3E is a flow chart illustrating an embodiment of a process for displaying a resulting set of images based on a display parameter. For example, this process may be used to perform 308. In some embodiments, the example process is used to arrange a collage of images (e.g., resulting from a search) where images along the right and/or bottom border are not necessarily aligned. Images may be arranged in any sequence (e.g., left to right from a top column, in a spiral fashion starting from a center point, etc.) and/or to have any overall shape (e.g., images arranged in a substantially rectangular collage, images arranged in a substantially ovular collage, etc.). At 351, a current placement location is set to an initial placement location. For example, the initial placement location is a top left corner of a display space. At 352, an image and its associated display parameter are obtained. At 354, the image is scaled and/or cropped according to the display parameter. For example, the display parameter may specify an image size different from the current image size, in which case the image is scaled up or down to fit the image size. The images may be cropped instead of scaled down. At 356, it is determined whether the (resized) image fits at the current location. In some embodiments, the initial location is the top left corner of the display space. If the image fits at a current placement location it is placed there at 358. At 360, it is determined whether there are additional images. If not, the process ends at 362. If there are additional images, the current placement location is changed to the next placement location at 364. In some embodiments, the next placement location is immediately to the right of the last placed image. In some embodiments, if the current placement location is at the end of a row, the next placement location is the first location in the next row. The process returns to 352 and the next image is placed.

In some embodiments, the above process results in a collage of images in the results display. In some embodiments, the above process is altered. If at 356, the image does not fit at the current location, another image is selected and resized at 354, and it is determined whether that image fits at the current location. Alternatively, it is determined if one or more images (that have been resized at 354) fit at the current location. In some embodiments, the images may only be sized in fixed units. In some embodiments, images are grouped with 0 or more other images into a group that takes up a fixed spaced with fixed dimensions. The image groups are then placed according to the above process.

Figure 4:
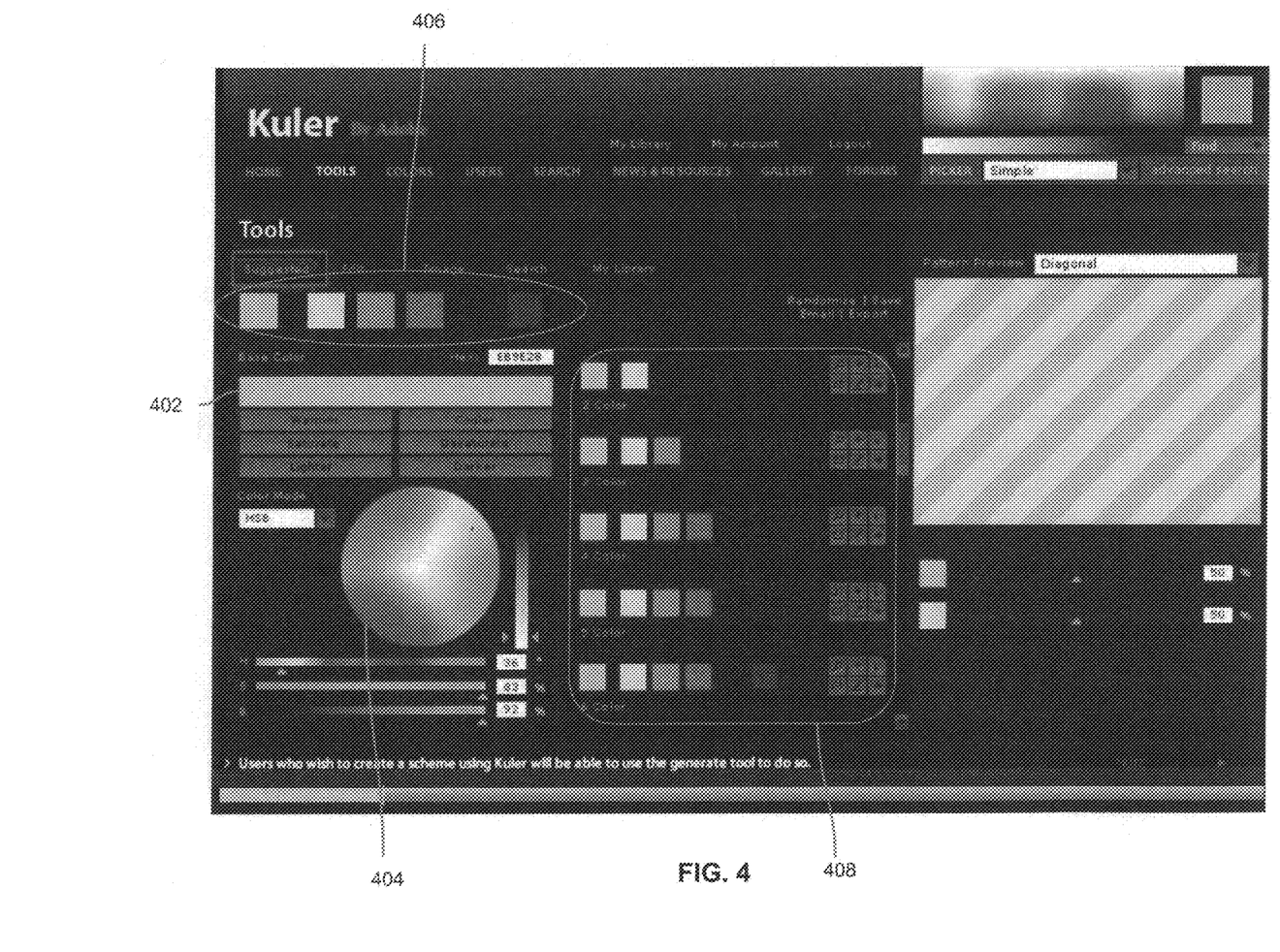
FIG. 4 is diagram illustrating an embodiment of a user interface for selecting one or more colors.

FIG. 4 is diagram illustrating an embodiment of a user interface for selecting one or more colors. In this example, base color 402 is selected from color picker circle 404. To the right of color picker circle 404 is a bar for making the base color darker or lighter. Above color picker circle 404 are buttons for adjusting warmth, saturation, and/or lightness. To the left of color picker circle 404 is a pull down menu for selecting a color mode. In this example, HSB mode is selected. Below color picker circle 404 are slider bars indicating the HSB percentages of the selected color. These values may be modified using the slider bar arrows.

In some embodiments, multiple other colors may be automatically or manually suggested and/or selected. In this example, colors 406 are suggested as colors to be grouped with the base color in a color search, for example, because they belong to a same color scheme. In panel 408, subsets of the color scheme are shown. Any one or more of these colors may be selected as search colors.

The interface illustrated in FIG. 4 in some embodiments is associated with creation, management, manipulation, and/or sharing of color schemes. In some embodiments, one or more users create a color scheme. They may then want to find images (e.g., from a collection of stock images) or other colors (e.g., created by other users) based on one or more colors in a particular color scheme. A search interface may suggest additional colors to search on based on a color scheme, and/or a user can specify a color scheme to use in a search.

Figure 5:
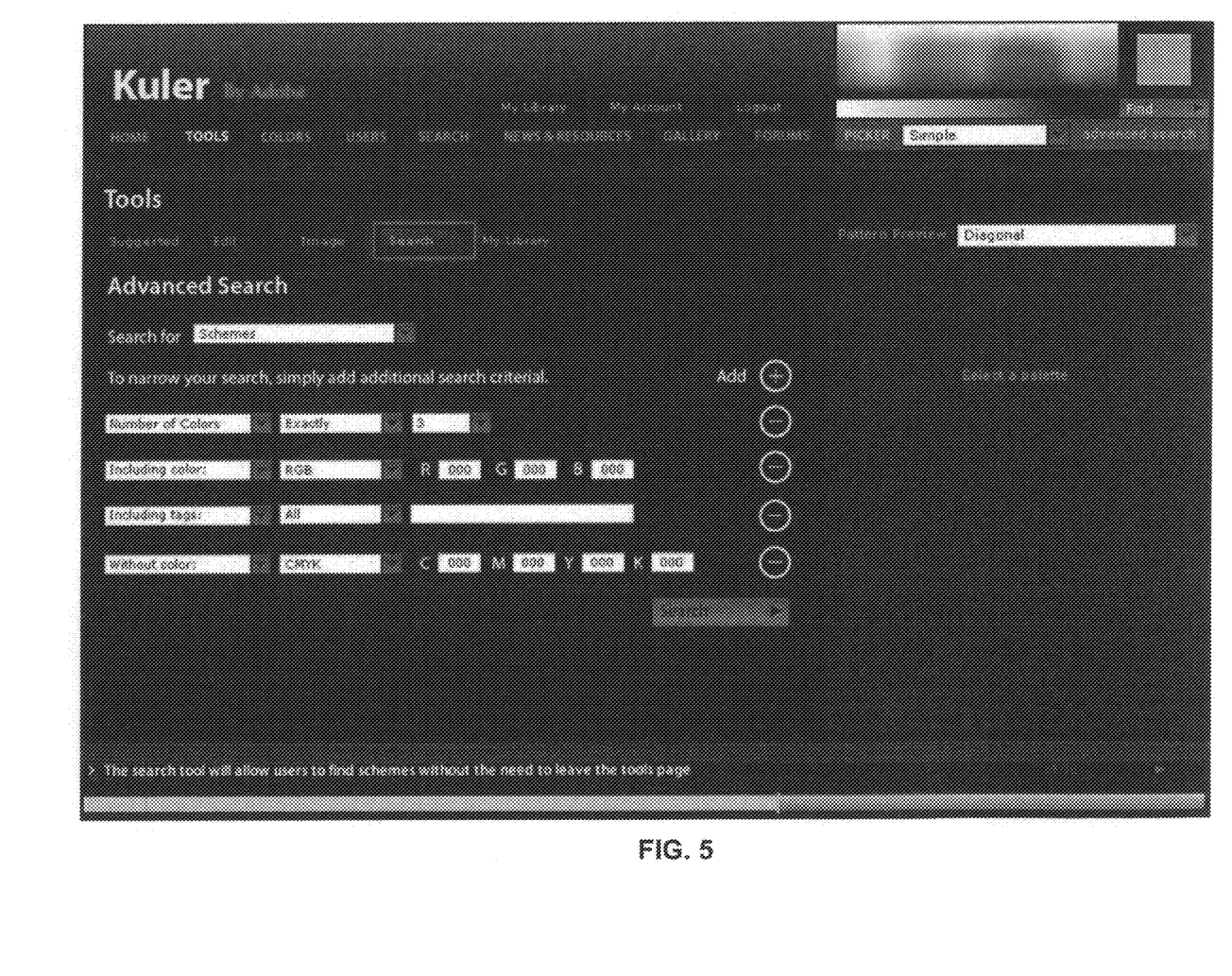
FIG. 5 is an example of a user interface for selecting parameters for a color search.

FIG. 5 is an example of a user interface for selecting parameters for a color search. For example, this user interface may open in response to selecting advanced search button 208. As shown, a "Search for" pull down menu allows a user to select an item to search for. For example, the pull down menu may include schemes, images, video, etc. The search may be narrowed using any of the other pull down menus, such as "Number of Colors," "Including color," "Including tags," and "Without color." This would allow, for example, a search for black and white images only. Various color modes may be used to specify colors in this example and the other examples described herein. For example, RGB, CMYK, HSB, or Lab value may be used. Dialog windows may open in response to selecting a pull down menu. For example, if a user selects "Number of Colors" as exactly two colors, then a dialog window may open for selecting the two colors. In some embodiments, a dialog window is similar to and/or includes features shown in the interface of FIG. 4. Additional search criteria may be added by selecting the corresponding "−" button and toggling the button so that "+" is displayed. Search criteria may be removed by selecting the appropriate button and toggling the state.

In some embodiments, an interface having features similar to those shown in FIG. 4 or FIG. 5 is used in combination with interface 200. As changes to the search color or to other search parameters are made, the images shown in results display 202 are updated, for example in real time. In some embodiments, an "update" button is selected before results display 202 is updated.

In various embodiments, other visual data may be searched based on color or other criteria. For example, in video search, a collection of videos are searched using one or more search colors. Some of the techniques described herein for searching a collection of images are used as appropriate to search through a collection of videos. In some embodiments, a time or point of reference associated with when the search color(s) occur in the video is specified or the color of an object depicted in the video (e.g., find a bouncing red ball) is specified. Similar to searching through a collection of images, other search criteria (such as tags, video format, or any metadata) may be specified.

Color is associated with the portion of the spectrum visible by people. Besides color, other portions of the spectrum may be similarly searched. For example audio data may be searched using a frequency analysis of the audio spectrum. In other words, instead of a color histogram, a histogram of the audio frequencies or pitch may be used. In some applications, a user is able to upload a snippet of audio and search for audio files that sounds like the snippet (e.g., find a video that includes the drum sound on a given snippet). Audio data that is spectrally similar to the snippet is returned. In addition, the spectrum over time may be analyzed and used to find audio data that matches in frequency and time. Tolerances may also be specified so that matches within a tolerance are returned.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, including:
receiving a search color;
receiving an exclusion color;
using a processor to search through a collection of one or more objects to obtain a resulting set of one or more objects based at least in part on the search color and excluding objects based at least in part on the exclusion color;
determining, for each of the resulting set of objects, a value of a display parameter that affects display of a corresponding object, resulting in a set of one or more display parameter values, wherein the display parameter includes a display size at which an object is displayed and the display size is based at least in part on a ratio of the number of pixels associated with the search color to the total number of pixels in the object in each of the resulting set of objects; and
displaying the resulting set of objects in a display window to satisfy a defined aspect ratio, wherein displaying the resulting set of objects is based at least in part on the set of display parameter values and the resulting set of objects are arranged in a collage wherein each of the displayed objects has substantially uniform spacing between itself and all adjacent displayed objects.

2. A method as recited in claim 1, wherein the collection of objects includes an image and/or video data.

3. A method as recited in claim 1, wherein the display parameter further includes an order in which an object is to be displayed.

4. A method as recited in claim 1, wherein the display parameter further includes a location where an object is displayed.

5. A method as recited in claim 1, wherein the search color is selected from a substantially continuous color range and/or is indicated in a user interface.

6. A method as recited in claim 1, wherein the search color includes a set of one or more colors and/or a color scheme comprising a plurality of colors.

7. A method as recited in claim 1, wherein the search color excludes a set of one or more colors.

8. A method as recited in claim 1, wherein searching is based at least in part on one or more of the following: a histogram associated with at least one of the collection of objects, a tag, a shape associated with a depicted object, or a depicted object.

9. A method as recited in claim 1, wherein determining is based at least in part on a histogram associated with at least one of the resulting set of objects.

10. A method as recited in claim 1, wherein determining is based at least in part on a number of pixels associated with the search color in an object being processed.

11. A method as recited in claim 1, further including determining a metric for each of the resulting set of objects, wherein determining is further based at least in part on the metric.

12. A method as recited in claim 1, wherein the substantially uniform spacing includes a substantially uniform gap.

13. A method as recited in claim 1, wherein each displayed object that is not on the border of the collage is adjacent to at least four other displayed objects.

14. A method as recited in claim 13, wherein each displayed object that is on the border of the collage is adjacent to at least two other displayed objects.

15. A method as recited in claim 1, wherein the displayed objects along at least two borders of the collage of objects are aligned.

16. A method as recited in claim 15, wherein images along the top and left borders of the collage are aligned.

17. A system, including:
a processor; and
a memory coupled with the processor, wherein the memory is configured to provide the processor with instructions which when executed cause the processor to:
receive a search color;
receive an exclusion color;
search through a collection of one or more objects to obtain a resulting set of one or more objects based at least in part on the search color and excluding objects based at least in part on the exclusion color;

determine, for each of the resulting set of objects, a value of a display parameter that affects display of a corresponding object, resulting in a set of one or more display parameter values, wherein the display parameter includes a display size at which an object is displayed and the display size is based at least in part on a ratio of the number of pixels associated with the search color to the total number of pixels in the object in each of the resulting set of objects; and display the resulting set of objects in a display window to satisfy a defined aspect ratio, wherein displaying the resulting set of objects is based at least in part on the set of display parameter values and each of the displayed objects has substantially uniform spacing between itself and an adjacent displayed object in the display window and the resulting set of objects are arranged in a collage wherein each of the displayed objects has substantially uniform spacing between itself and all adjacent displayed objects.

18. A system as recited in claim 17, wherein the display parameter further includes a location where an object is displayed.

19. A system as recited in claim 17, wherein determining is based at least in part on a number of pixels associated with the search color in an object being processed.

20. A system as recited in claim 17, wherein the substantially uniform spacing includes a substantially uniform gap.

21. A computer program product, the computer program product being embodied in a tangible computer readable storage medium and comprising computer instructions for:

receiving a search color;

receiving an exclusion color;

searching through a collection of one or more objects to obtain a resulting set of one or more objects based at least in part on the search color and excluding objects based at least in part on the exclusion color;

determining, for each of the resulting set of objects, a value of a display parameter that affects display of a corresponding object, resulting in a set of one or more display parameter values, wherein the display parameter includes a display size at which an object is displayed and the display size is based at least in part on a ratio of the number of pixels associated with the search color to the total number of pixels in the object in each of the resulting set of objects; and displaying the resulting set of objects in a display window to satisfy a defined aspect ratio, wherein displaying the resulting set of objects is based at least in part on the set of display parameter values and each of the displayed objects has substantially uniform spacing between itself and an adjacent displayed object in the display window and the resulting set of objects are arranged in a collage wherein each of the displayed objects has substantially uniform spacing between itself and all adjacent displayed objects.

22. A computer program product as recited in claim 21, wherein the display parameter further includes a location where an object is displayed.

23. A computer program product as recited in claim 21, wherein determining is based at least in part on a number of pixels associated with the search color in an object being processed.

24. A computer program product as recited in claim 21, wherein the substantially uniform spacing includes a substantially uniform gap.

\* \* \* \* \*